US008831166B2

(12) United States Patent
Mariani

(10) Patent No.: US 8,831,166 B2
(45) Date of Patent: Sep. 9, 2014

(54) ZIRCONIUM-BASED ALLOYS, NUCLEAR FUEL RODS AND NUCLEAR REACTORS INCLUDING SUCH ALLOYS, AND RELATED METHODS

(75) Inventor: Robert Dominick Mariani, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 656 days.

(21) Appl. No.: 13/021,480

(22) Filed: Feb. 4, 2011

(65) Prior Publication Data

US 2012/0201341 A1 Aug. 9, 2012

(51) Int. Cl.
*C22C 16/00* (2006.01)
*G21C 1/01* (2006.01)
*G21C 3/07* (2006.01)
*C22C 1/04* (2006.01)
*B22F 3/12* (2006.01)
*G21C 3/00* (2006.01)

(52) U.S. Cl.
CPC .............. *C22C 16/00* (2013.01); *C22C 1/0458* (2013.01); *Y02E 30/40* (2013.01); *G21C 3/07* (2013.01); *B22F 3/12* (2013.01)
USPC ........... 376/457; 376/347; 376/354; 376/409; 376/412; 376/414; 376/426; 376/434; 420/422; 420/423; 148/400; 148/422

(58) Field of Classification Search
USPC ........... 148/400, 421; 420/422, 423; 376/308, 376/347, 354, 409, 426, 434, 457, 412, 376/414–416
See application file for complete search history.

(56) References Cited

U.S. PATENT DOCUMENTS

| 3,121,034 | A | * | 2/1964 | Anderko et al. | 376/457 |
|---|---|---|---|---|---|
| 3,150,972 | A | * | 9/1964 | Rosler | 420/422 |
| 3,261,682 | A | * | 7/1966 | Rosler | 420/423 |
| 3,303,065 | A | * | 2/1967 | Reynolds | 148/421 |
| 3,674,571 | A | * | 7/1972 | Van Thyne et al. | 420/422 |
| 4,197,145 | A |   | 4/1980 | Hanneman et al. | |
| 4,212,686 | A | * | 7/1980 | Lunde et al. | 420/422 |
| 4,649,023 | A | * | 3/1987 | Sabol et al. | 420/422 |

(Continued)

OTHER PUBLICATIONS

ASTM (American Society for Testing and Materials) International Standard Test Method Designation E112—10, "Standard Test Methods for Determining Average Grain Size," 26 pages, (Dec. 23, 2010).

(Continued)

*Primary Examiner* — Bernarr Gregory
(74) *Attorney, Agent, or Firm* — Traskbritt, P.C.

(57) ABSTRACT

Zirconium-based metal alloy compositions comprise zirconium, a first additive in which the permeability of hydrogen decreases with increasing temperatures at least over a temperature range extending from 350° C. to 750° C., and a second additive having a solubility in zirconium over the temperature range extending from 350° C. to 750° C. At least one of a solubility of the first additive in the second additive over the temperature range extending from 350° C. to 750° C. and a solubility of the second additive in the first additive over the temperature range extending from 350° C. to 750° C. is higher than the solubility of the second additive in zirconium over the temperature range extending from 350° C. to 750° C. Nuclear fuel rods include a cladding material comprising such metal alloy compositions, and nuclear reactors include such fuel rods. Methods are used to fabricate such zirconium-based metal alloy compositions.

42 Claims, 3 Drawing Sheets

(56) References Cited

U.S. PATENT DOCUMENTS

| | | | |
|---|---|---|---|
| 5,017,336 A * | 5/1991 | Matsuo et al. | 420/422 |
| 5,196,163 A * | 3/1993 | Matsuo et al. | 420/422 |
| 5,244,514 A * | 9/1993 | Garde | 148/421 |
| 5,417,780 A | 5/1995 | Adamson et al. | |
| 5,787,142 A * | 7/1998 | Van Swam | 376/457 |
| 5,972,288 A * | 10/1999 | Jeong et al. | 420/422 |
| 5,985,211 A * | 11/1999 | Jeong et al. | 420/423 |
| 6,261,516 B1 * | 7/2001 | Jeong et al. | 420/422 |
| 6,325,966 B1 * | 12/2001 | Jeong et al. | 420/422 |
| 7,704,334 B2 | 4/2010 | Zavodchikov et al. | |
| 2010/0040189 A1 | 2/2010 | Brachet et al. | |

OTHER PUBLICATIONS

Mardon et al., "Update on the Development of Advanced Zirconium Alloys for PWR Fuel Rod Claddings, International Topical Meeting on Light Water Reactor Fuel Performance," Portland, Oregon (Mar. 2-6, 1997) (Published by the American Nuclear Society, Inc., La Grange Park, Ill. 60526, USA).

Rempe et al., "Evaluation of Specialized Thermocouples for High-Temperature In-Pile Testing," Proceedings of ICAPP '06, INL/CON-05-00944, Jun. 2006, 7 pages.

* cited by examiner

ZIRCONIUM-BASED ALLOYS, NUCLEAR FUEL RODS AND NUCLEAR REACTORS INCLUDING SUCH ALLOYS, AND RELATED METHODS

STATEMENT REGARDING FEDERALLY SPONSORED RESEARCH OR DEVELOPMENT

This invention was made with government support under Contract Number DE-AC07-05ID14517 awarded by the United States Department of Energy. The government has certain rights in the invention.

TECHNICAL FIELD

Embodiments of the disclosure generally relate to zirconium-based metal alloy compositions, to nuclear fuel rods including such alloy compositions, nuclear reactors including such fuel rods, and to methods of making and using such alloys, fuel rods, and reactors.

BACKGROUND

Nuclear reactors are used to generate power (e.g., electrical power) using nuclear fuel materials. For example, heat generated by nuclear reactions carried out within the nuclear fuel materials may be used to boil water, and the steam resulting from the boiling water may be used to rotate a turbine. Rotation of the turbine may be used to operate a generator for generating electrical power.

Nuclear reactors generally include what is referred to as a "nuclear core," which is the portion of the nuclear reactor that includes the nuclear fuel material and is used to generate heat from the nuclear reactions of the nuclear fuel material. The nuclear core may include a plurality of fuel rods, which include the nuclear fuel material.

Most nuclear fuel materials include one or more of the elements of uranium and plutonium (although other elements such as thorium are also being investigated). There are, however, different types or forms of nuclear fuel materials that include such elements. For example, nuclear fuel pellets may comprise ceramic nuclear fuel materials. Ceramic nuclear fuel materials include, among others, radioactive uranium oxide (e.g., uranium dioxide, $UO_2$, which is often abbreviated as "UOX"), which is often used to form nuclear fuel pellets. Mixed oxide radioactive ceramic materials (which are often abbreviated as "MOX") are also commonly used to form nuclear fuel pellets. Such mixed oxide radioactive ceramic materials may include, for example, a blend of plutonium oxide and uranium oxide. Such a mixed oxide may include, for example, $U_{1-x}Pu_xO_2$, wherein x is between about 0.2 and about 0.3. Transuranic (TRU) mixed oxide radioactive ceramic materials (which are often abbreviated as "TRU-MOX") also may be used to form nuclear fuel pellets. Transuranic mixed oxide radioactive ceramic materials include relatively higher concentrations of minor actinides such as, for example, neptunium (Np), americium (Am), and curium (Cm). Carbide nuclear fuels and mixed carbide nuclear fuels having compositions similar to the oxides mentioned above, but wherein carbon is substituted for oxygen, are also being investigated for use in nuclear reactors.

In addition to ceramic nuclear fuel materials, there are also metallic nuclear fuel materials. Metallic nuclear fuels include, for example, metals based on one or more of uranium, plutonium, and thorium. Other elements such as hydrogen (H), zirconium (Zr), molybdenum (Mo), and others may be incorporated into uranium- and plutonium-based metals.

In nuclear reactors that employ metallic nuclear fuels, the metallic nuclear fuel is often formed into rods or pellets of predetermined size and shape (e.g., spherical, cubical, cylindrical, etc.) that are at least substantially comprised of the metallic nuclear fuel. The nuclear fuel material is contained within and at least partially surrounded by a cladding material, which may comprise, for example, an elongated tube. The cladding material is used to hold and contain the nuclear fuel. The cladding material typically comprises a metal or metallic alloy, such as stainless steel. During operation of the nuclear reactor, the cladding material may separate (e.g., isolate and hermetically seal) the nuclear fuel bodies from a liquid (e.g., water or molten salt) that is used to absorb and transport the heat generated by the nuclear reaction occurring within the nuclear fuel.

Zirconium-based metal alloys have been employed as cladding materials, since they may exhibit relatively low absorption of thermal neutrons. For example, a class of such zirconium-based metal alloys is referred to in the art as "Zircaloys." Another zirconium-based alloy that has been employed as cladding material is referred to in the art as "M5" alloy. M5 alloy has been reported to contain, in weight percentages: niobium 0.81-1.2 wt %; oxygen 0.090-0.149 wt %, zirconium—the balance (Mardon et al., Update on the Development of Advanced Zirconium Alloys for PWR Fuel Rod Claddings, International Topical Meeting on Light Water Reactor Fuel Performance, Portland, Oreg. (Mar. 2-6, 1997) (Published by the American Nuclear Society, Inc., La Grange Park, Ill. 60526, USA). It is known that Zircaloys and M5 Alloy have a relatively affinity to hydrogen. Absorption of hydrogen in Zircaloys and M5 Alloy may lead to hydrogen embrittlement. When such alloys are employed as cladding material in nuclear fuel bodies and reactors, such hydrogen embrittlement can lead to failure of the cladding material.

BRIEF SUMMARY

In some embodiments, the present disclosure includes zirconium-based metal alloy compositions that comprise zirconium, a first additive in which the permeability of hydrogen decreases with increasing temperatures at least over a temperature range extending from 350° C. to 750° C., and a second additive having a solubility in zirconium over the temperature range extending from 350° C. to 750° C. At least one of a solubility of the first additive in the second additive over the temperature range extending from 350° C. to 750° C. and a solubility of the second additive in the first additive over the temperature range extending from 350° C. to 750° C. is higher than the solubility of the second additive in zirconium over the temperature range extending from 350° C. to 750° C.

In additional embodiments, the present disclosure includes nuclear fuel rods for use in a nuclear reaction that comprise a volume of nuclear fuel material, and a cladding material at least partially surrounding the volume of nuclear fuel material. The cladding material comprises a zirconium-based metal alloy composition that includes zirconium, a first additive in which the permeability of hydrogen decreases with increasing temperatures at least over a temperature range extending from 350° C. to 750° C., and a second additive having a solubility in zirconium over the temperature range extending from 350° C. to 750° C. At least one of a solubility of the first additive in the second additive over the temperature range extending from 350° C. to 750° C. and a solubility of the second additive in the first additive over the temperature range extending from 350° C. to 750° C. is higher than the solubility of the second additive in zirconium over the temperature range extending from 350° C. to 750° C.

In yet further embodiments, the present disclosure includes nuclear reactors that comprise a reactor core for generating thermal energy in which at least one fuel rod is disposed within a liquid. The at least one fuel rod includes at least one nuclear fuel material at least partially surrounded by a cladding material. The cladding material comprises a zirconium-based metal alloy composition that includes zirconium, a first additive in which the permeability of hydrogen decreases with increasing temperatures at least over a temperature range extending from 350° C. to 750° C., and a second additive having a solubility in zirconium over the temperature range extending from 350° C. to 750° C. At least one of a solubility of the first additive in the second additive over the temperature range extending from 350° C. to 750° C. and a solubility of the second additive in the first additive over the temperature range extending from 350° C. to 750° C. is higher than the solubility of the second additive in zirconium over the temperature range extending from 350° C. to 750° C.

In additional embodiments, the present disclosure includes methods of making and using such alloy compositions, fuel rods, and nuclear reactors. For example, in some embodiments, the present disclosure includes methods of forming zirconium-based metal alloy compositions. In accordance with such methods, a particle mixture is formed, the particle mixture is pressed to form a green body, and the green body is sintered. For example, zirconium particles, first additive particles, second additive particles, and third additive particles may be mixed together to form the particle mixture. The first additive particles may be selected to comprise one or more elements in which the permeability of hydrogen decreases with increasing temperatures at least over a temperature range extending from 350° C. to 750° C. The second additive particles may be selected to comprise an element having a solubility in zirconium over the temperature range extending from 350° C. to 750° C. At least one of a solubility of the element of the first additive particles in the element of the second additive particles over the temperature range extending from 350° C. to 750° C. and a solubility of the element of the second additive particles in the element of the first additive particles over the temperature range extending from 350° C. to 750° C. is higher than the solubility of the element of the second additive particles in zirconium over the temperature range extending from 350° C. to 750° C. The third additive particles may be selected to comprise a dispersed grain-growth inhibitor that impedes the growth of grains of a zirconium-based metal alloy composition over the temperature range extending from 350° C. to 750° C.

BRIEF DESCRIPTION OF THE SEVERAL VIEWS OF THE DRAWINGS

While the specification concludes with claims particularly pointing out and distinctly claiming what are regarded as embodiments of the present disclosure, the advantages of embodiments of the disclosure may be more readily ascertained from the following description of certain example embodiments of the disclosure when read in conjunction with the accompanying drawings in which:

DETAILED DESCRIPTION

Figure 1:
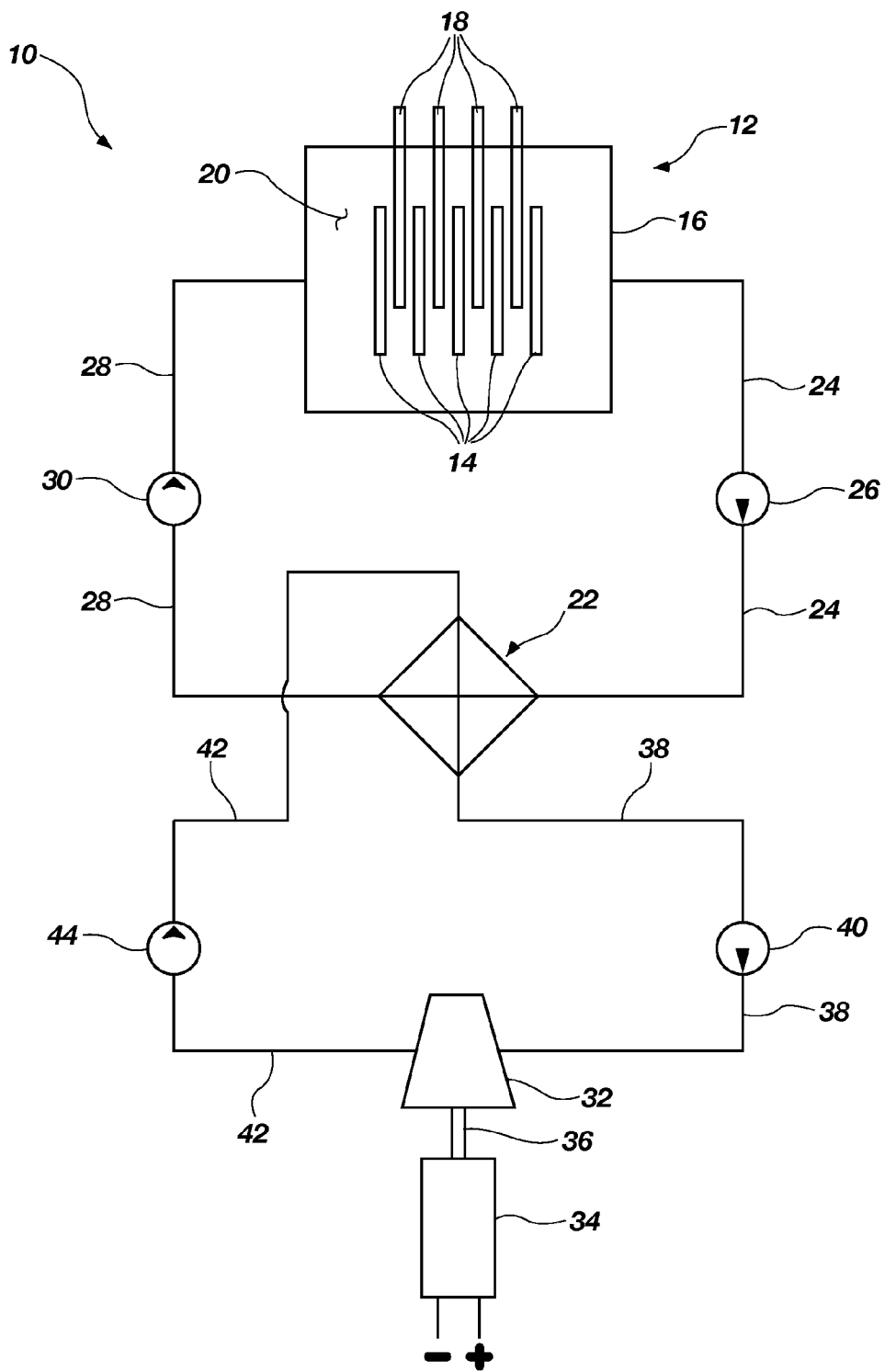
FIG. 1 is a simplified schematic diagram of an embodiment of a nuclear reactor system of the disclosure.

FIG. 1 is a simplified schematic diagram illustrating an example embodiment of a nuclear reactor 10 of the disclosure, which includes a zirconium-based metal alloy composition, as described in further detail below (in nuclear fuel rods 14 employed in the nuclear reactor 10). The nuclear reactor 10 includes a reactor core 12 that includes the fuel rods 14, which are located within a chamber 16. The fuel rods 14 may be elongated and oriented at least substantially parallel to one another in an ordered array. The fuel rods 14 include a cladding comprising a zirconium-based metal alloy composition as described herein. The cladding may at least partially surround bodies of nuclear fuel material. Nuclear reactions that generate thermal energy may be carried out in the bodies of nuclear fuel within the fuel rods 14. The reactor core 12 also includes control rods 18 that may be positioned between the fuel rods 14 for controlling the nuclear reactions carried out within the fuel rods 14. For example, the control rods 18 may comprise a material or materials that will absorb neutrons emitted as part of, and that contribute to, the nuclear reactions carried out within the fuel rods 14. Thus, by controlling the relative positions between the control rods 18 and the fuel rods 14, the number of neutrons that are absorbed by the control rods 18 may be selectively increased or decreased, thereby effectively increasing or decreasing (in a selective manner) the rate at which the nuclear reaction carried out within the fuel rods 14 proceeds.

The fuel rods 14 may be immersed within a reactor liquid 20 contained within the chamber 16. The reactor liquid 20 may absorb heat generated by the nuclear reaction carried out within the fuel rods 14. The reactor liquid 20 may comprise, for example, water, liquid metal, a liquid salt, etc. The heated reactor liquid 20 may be caused to flow through a closed loop circuit that includes a heat exchanger 22. For example, the heated reactor liquid 20 may be caused to flow from the chamber 16 to the heat exchanger 22 through a conduit 24. A pressurizing device 26 may be provided along the conduit 24 for maintaining the reactor liquid 20 within the conduit 24 at or above a selected pressure.

The reactor liquid 20 may flow through the heat exchanger 22 and back to the chamber 16 of the reactor core 12 through another conduit 28. A pump 30 may be provided along the conduit 28 for pumping the reactor liquid 20 through the closed loop circuit extending from the chamber 16 of the reactor core 12, to the heat exchanger 22, and back to the chamber 16.

With continued reference to FIG. 1, the nuclear reactor 10 further includes a turbine 32 and a generator 34. The generator 34 may be coupled to the turbine 32 through a drive shaft 36. As the turbine 32 is caused to rotate, the turbine 32 rotates the drive shaft 36, and the generator 34 generates electricity responsive to rotation of the drive shaft 36.

The turbine 32 may comprise a steam turbine, and the steam used to rotate the turbine 32 may be generated by heating water or another liquid within the heat exchanger 22 using the heat of the reactor liquid 20 flowing through the heat exchanger 22. In other words, the heat in the reactor liquid 20 may be exchanged to the water or other liquid within the heat exchanger 22. The heated water and/or steam generated within the heat exchanger 22 may be carried to the turbine 32 through a conduit 38. If desirable, a pressurizing device 40 may be provided along the conduit 38 for maintaining the heated water and/or steam within the conduit 38 at, or above, a selected pressure. The steam may be used to drive rotation of the turbine 32, as previously mentioned, after which the steam may be cooled and condensed to water, which may be returned to the heat exchanger 22 through a conduit 42. A pump 44 may be provided along the conduit 42 for pumping the water back to the heat exchanger 22.

Thus, the nuclear reactor 10 of FIG. 1 may be used to generate electricity from the heat provided by the nuclear reaction carried out within the fuel rods 14 in the reactor core 12. Embodiments of nuclear reactors of the present disclosure may be of various types and configurations that include a zirconium-based metal alloy composition as described below in a component, such as a fuel rod 14, of the nuclear reactor 10, and may differ in type and configuration from the nuclear reactor 10 of FIG. 1, which is described herein as a non-limiting example of a nuclear reactor that may embody the present disclosure.

Figure 2:
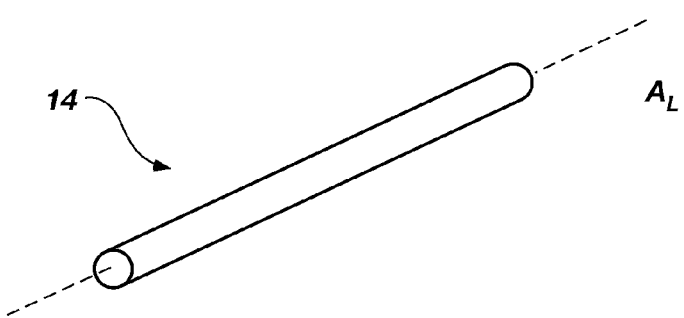
FIG. 2 is a simplified perspective view of an embodiment of a fuel rod of the nuclear reactor system of FIG. 1 that includes an embodiment of a body of nuclear fuel of the disclosure.

As previously mentioned, the fuel rods 14 may comprise a zirconium-based metal alloy composition in accordance with additional embodiments of the disclosure. FIG. 2 is a perspective view of a fuel rod 14 of the nuclear reactor 10 of FIG. 1. As shown in FIG. 2, the fuel rod 14 may be elongated, and may be generally cylindrical. In other embodiments, the fuel rod 14 may have a cross-sectional shape (i.e., a shape in a plane transverse to a longitudinal axis $A_L$ of the fuel rod 14) that is triangular, square, hexagonal, octagonal, etc. The fuel rod 14 comprises at least one volume of nuclear fuel material that is at least partially surrounded by a cladding material.

Figure 3:
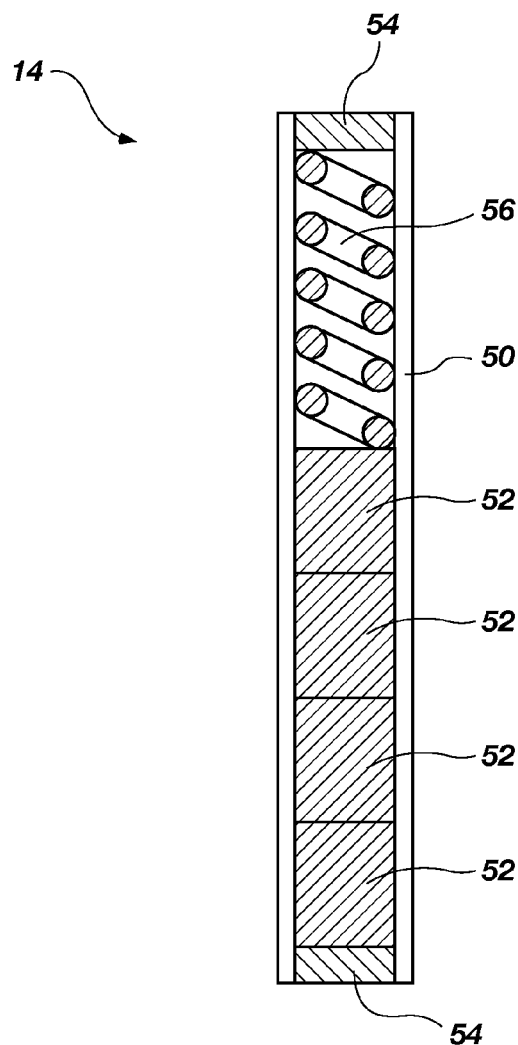
FIG. 3 is a simplified cross-sectional view of the fuel rod of FIG. 2 and illustrates the body of nuclear fuel therein.

For example, FIG. 3 is a simplified, longitudinal cross-sectional view of the fuel rod 14 of FIG. 2. As shown in FIG. 3, the fuel rod 14 may comprise an elongated hollow cylindrical cladding tube 50. The cladding tube 50 may comprise a zirconium-based metal alloy composition as described in further detail below.

A plurality of nuclear fuel bodies 52 may be disposed within the cladding tube 50. The nuclear fuel bodies 52 may comprise pellets, slugs, balls, or other shaped particles that comprise nuclear fuel material. The nuclear fuel bodies 52 may have an outer diameter that is similar in size, but slightly smaller than, an inner diameter of the cladding tube 50, and the nuclear fuel bodies 52 may be stacked in an end-to-end configuration within the cladding tube 50, as shown in FIG. 3.

As shown in FIG. 3, caps or plugs 54 may be provided at the ends of the cladding tube 50, such that the cladding tube 50 is at least substantially hermetically sealed. The plugs 54 may comprise a material similar or identical in composition to that of the cladding tube 50.

The nuclear fuel bodies 52 may not occupy the entire space within the cladding tube 52, and a spring member 56 (e.g., a coil spring) may be provided between an end of a stack of the nuclear fuel bodies 52 and a plug 54, as shown in FIG. 3. Any void or space within the cladding tube 50 not occupied by the nuclear fuel bodies 52 may be occupied by an inert gas such as argon.

As previously mentioned, the cladding tube 50 may comprise a zirconium-based metal alloy composition. The zirconium-based metal alloy composition may comprise zirconium, a first additive comprising a metal other than zirconium, and a second additive comprising another metal other than zirconium and the first additive. In some embodiments, the zirconium may comprise about ninety percent by weight (90.0 wt %) or more of the zirconium-based metal alloy composition, about ninety-three percent by weight (93.0 wt %) or more of the zirconium-based metal alloy composition, or even about ninety-nine percent by weight (99.0 wt %) or more of the zirconium-based metal alloy composition.

The first additive may comprise one or more metal elements in which the permeability of hydrogen decreases with increasing temperature, at least over a temperature range extending from 350° C. to 750° C. By way of example and not limitation, the first additive may comprise one or more elements selected from the group consisting of niobium (Nb), tantalum (Ta), and vanadium (V). The first additive may comprise, for example, between about one-tenth of one percent by weight (0.1 wt %) and about nine percent by weight (9.0 wt %) of the zirconium-based metal alloy composition.

The second additive comprises one or more elements that are selected to induce phase segregation within the zirconium-based metal alloy composition, such that a secondary phase comprising the second additive is formed, and further to cause the first additive to be drawn out from the primary zirconium-based phase into the secondary phase comprising the second additive. For example, the second additive may comprise one or more elements having a higher affinity for the first additive relative to zirconium. The second additive may have little to no solubility in zirconium over the temperature range extending from 350° C. to 750° C. The second additive may be selected such that a solubility of the first additive in the second additive and/or a solubility of the second additive in the first additive is higher than any solubility of the second additive in zirconium over the same temperature range (350° C. to 750° C.). It may be desirable in some embodiments to select the second additive such that the solubility of the second additive in the first additive over the temperature range extending from 350° C. to 750° C. is higher than the solubility of the second additive in zirconium over the temperature range extending from 350° C. to 750° C.

By way of example and not limitation, the second additive may comprise one or more elements selected from the group consisting of molybdenum (Mo), antimony (Sb), and palladium (Pd). The second additive may comprise, for example, between about one-hundredth of one percent by weight (0.01 wt %) and about one percent by weight (1.0 wt %) of the zirconium-based metal alloy composition.

In some embodiments, the first additive and the second additive may exhibit at least substantially ideal solid solution behavior with respect to one another over the temperature range extending from about 350° C. to about 750° C. For example, molybdenum exhibits at least substantially ideal solid solution behavior with niobium. Molybdenum is insoluble in zirconium at temperatures up to about 730° C., but is soluble in the beta phase of zirconium (β-Zr) at temperatures over about 863° C.

The first additive is used to increase permeability of hydrogen with decreasing temperature. The second additive is used to induce phase-segregation of one or more elements of the first additive from the zirconium-based primary phase. These first and second additives may be used to mitigate or avoid the phenomenon of hydrogen embrittlement within the zirconium-based metal alloy composition, which may result in increased useable lifetime of, for example, cladding tubes 50 that comprise the zirconium-based metal alloy composition. Since the permeability of hydrogen in the first additive decreases with increasing temperature, when the cladding tube 50 is being heated during startup of the nuclear reactor 10 and being cooled during shutdown of the nuclear reactor 10, a temperature gradient may exist across the thickness of the cladding tube 50, such that exterior surfaces of the cladding tube 50 are cooler than interior surfaces of the cladding tube 50. Thus, there will be a driving force causing the hydride precipitation zones toward the colder exterior surfaces of the cladding tube 50. At least a fraction of the first additive may reside on the boundaries of the primary phase grains to promote transport of hydrogen.

Optionally, the zirconium-based metal alloy composition may include a third additive, which may serve as a dispersed grain growth inhibitor that impedes the growth of grains of the zirconium-based metal alloy composition over the temperature range extending from 350° C. to 750° C. For example, the dispersion of grain growth inhibitor particles may impede the growth of grains of the primary zirconium-based phase in the zirconium-based metal alloy composition. The grain growth inhibitor may present a separate phase within the zirconium-based metal alloy composition, and may not dissolve in any significant quantity in zirconium or the first and second additives. Further, if the grain growth inhibitor comprises a compound, the grain growth inhibitor compound may be relatively more stable than compounds of zirconium and other elements present within the composition over the intended operating temperatures and conditions.

For example, the third additive grain growth inhibitor may comprise one or more oxide materials. As non-limiting example, the third additive may comprise one or more materials selected from thorium oxide ($ThO_2$), yttrium oxide ($Y_2O_3$), the group of lanthanum oxides, such as $La_2O_3$, neodymium oxide ($Nd_2O_3$), cerium oxide ($CeO_2$), dysprosium oxide ($Dy_2O_3$), etc. The third additive may comprise, for example, between about five-hundredths of one percent by weight (0.05 wt %) and about five-tenths of one percent by weight (0.50 wt %) of the zirconium-based metal alloy composition.

As the cladding tube 50 may be subjected to repeated heating and cooling thermal cycles during the operation of the nuclear reactor 10, a thermal driving force may exist for microstructural evolution, such as grain growth, within the zirconium-based metal alloy composition of the cladding tube 50. Thus, the third additive comprising the grain growth inhibitor may be employed to inhibit grain growth within the zirconium-based metal alloy composition during such thermal cycles. The grain growth inhibitor may also stabilize any zirconium oxide ($ZrO_2$) scale that might form on surfaces (e.g., exterior surfaces) of the cladding tube 50.

Figure 4:
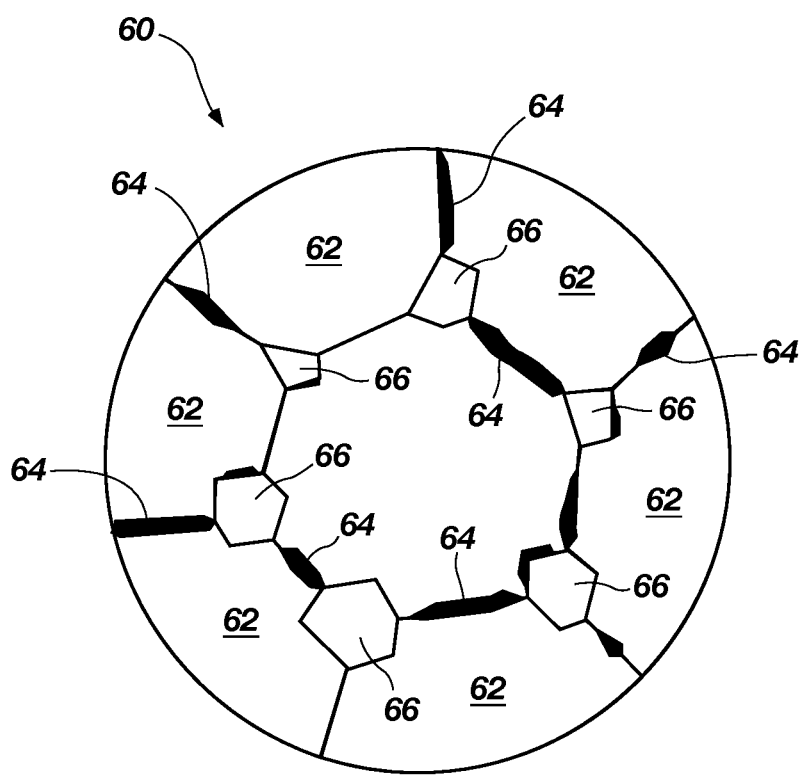
FIG. 4 is a highly simplified drawing illustrating how a microstructure of a zirconium-based metal alloy composition may appear under magnification, and illustrates grains of a primary phase, a secondary phase between the grains of the primary phase, and grains of a dispersed tertiary phase, which are present at so-called triple points among the grains of the primary phase.

FIG. 4 is a highly simplified drawing illustrating how a microstructure 60 of a zirconium-based metal alloy composition may appear under magnification. As shown in FIG. 4, a zirconium-based metal alloy composition as described above may have a microstructure 60 that includes primary phase grains 62 of a zirconium-based metal alloy. A secondary phase 64 (shown as the shaded areas on FIG. 4) comprising a metal or metal alloy that includes the second additive may be located between the primary phase grains 62 (e.g., on and around the primary phase grains). In other words, the microstructure 60 may comprise a first plurality of grains 62 comprising a first phase, and a second phase 64 disposed at grain boundaries of the first plurality of grains 62. The first phase is the primary phase comprising grains 62 of a zirconium-based metal alloy, and the second phase 64 comprises a metal alloy based on the second additive.

In some embodiments, the primary phase grains 62 comprising the zirconium-based metal alloy may have an average grain size of between about seven hundred fifty nanometers (750 nm) and about one hundred microns (100 μm). For example, in some embodiments, the primary phase grains 62 comprising the zirconium-based metal alloy may have an average grain size of between about one micron (1.0 μm) and about one hundred microns (100 μm), or even between about five microns (5 μm) and about fifty microns (50 μm).

The primary phase grains 62 comprising the zirconium-based metal alloy may comprise between about ninety percent (90%) and about ninety-nine and one-half percent (99.5%) of the volume of the zirconium-based metal alloy composition.

The second phase 64 that comprises a metal or metal alloy that includes the second additive may comprise between about three-tenths of one percent (0.3%) and about ten percent (10%) of the volume of the zirconium-based metal alloy composition. In some embodiments, the second phase 64 may comprise a second plurality of grains having an average grain size of between about ten nanometers (10 nm) and about one thousand nanometers (1,000 nm). For example, in some embodiments, the second phase grains may have an average grain size of between about twenty-five nanometers (25 nm) and about five hundred nanometers (500 nm), or even between about fifty nanometers (50 nm) and about two hundred fifty nanometers (250 nm).

Further, in embodiments in which the zirconium-based metal alloy composition includes a third additive that serves as a grain growth inhibitor, the microstructure of the zirconium-based metal alloy composition may further include grains 66 of a third phase comprising the third additive. These third phase grains 66 may be disposed between the primary phase grains 62 of the zirconium-based metal alloy, and may be disposed at triple points between the primary phase grains 62. Such triple points are locations at which the intersections of at least three primary phase grains 62. The third phase grains 66 that include the third grain growth inhibitor additive may comprise between about six-hundredths of one percent (0.06%) and about six-tenths of one percent (0.6%) of the volume of the zirconium-based metal alloy composition. In some embodiments, the third phase may comprise a third plurality of grains 66 having an average grain size of between about two nanometers (2 nm) and about one hundred nanometers (100 nm). For example, in some embodiments, the third phase grains 66 may have an average grain size of between about five nanometers (5 nm) and about fifty nanometers (50 nm), or even between about ten nanometers (10 nm) and about thirty nanometers (30 nm).

The average grain size of the grains of any of the phases in the microstructure of embodiments of zirconium-based metal alloy compositions of the disclosure may be further determined in accordance with the standard test methods defined in ASTM (American Society for Testing and Materials) International Standard Test Method Designation E112-10, which is entitled "Standard Test Methods for Determining Average Grain Size," and is incorporated herein in its entirety by this reference. In some embodiments, the primary phase grains 62 may have an average Grain Size No. (G) of between about 3.5 and about 17.8, which ASTM International Standard Test Method Designation E112-10. In some embodiments, the primary phase grains 62 may have an average Grain Size No. (G) of between about 3.5 and about 17. In some embodiments, the primary phase grains 62 may have an average Grain Size No. (G) of between about 5.5 and about 12.5.

As non-limiting examples, the cladding tube 50 may comprise a zirconium-based metal alloy composition having an overall chemical composition of any of the Sample Compositions 1 through 8 identified in Table 1 below:

TABLE 1

| | Elemental Composition in Weight Percent | | | | | | | | | | | |
|---|---|---|---|---|---|---|---|---|---|---|---|---|
| Ex. | Zr | Nb | Ta | V | Mo | Pd | La | Th | Y | O | H | Other |
| 1 | bal. | 9.00 | — | — | 1.00 | — | 0.051 | — | — | 0.034 | 0.002 | 0.010 |
| 2 | bal. | 4.50 | — | — | 0.50 | — | — | 0.053 | — | 0.037 | 0.005 | 0.015 |
| 3 | bal. | 0.90 | — | — | 0.10 | — | — | — | 0.047 | 0.038 | 0.010 | 0.010 |
| 4 | bal. | 1.20 | — | — | — | 0.20 | 0.213 | 0.220 | — | 0.092 | 0.025 | 0.015 |
| 5 | bal. | — | 1.20 | — | 0.20 | — | — | 0.220 | 0.197 | 0.113 | 0.002 | 0.010 |
| 6 | bal. | — | 1.20 | — | — | 0.10 | — | — | 0.360 | 0.153 | 0.005 | 0.015 |
| 7 | bal. | — | — | 1.20 | 0.10 | — | — | 0.264 | 0.236 | 0.125 | 0.010 | 0.010 |
| 8 | bal. | — | — | 1.20 | — | 0.90 | 0.085 | — | 0.394 | 0.151 | 0.025 | 0.015 |

(Ex. = Example; bal. = balance)

Additional embodiments of the disclosure include methods of forming zirconium-based metal alloy compositions such as those described above. In some embodiments, a zirconium-based metal alloy composition as described herein may be formed by providing a particle mixture including particles of the various components to be incorporated into the zirconium-based metal alloy composition, pressing the particle mixture to form a "green" (i.e., unsintered) body, and sintering the green body to consolidate the particles and form a three-dimensional body, such as a cladding tube 50 of a fuel rod 14.

Explaining further, a particle mixture may be formed by mixing zirconium particles, particles of a first additive, particles of a second additive, and optionally particles of a third additive, wherein the first, second, and third additives are as previously described hereinabove. Thus, the first additive particles may be selected to comprise one or more elements in which the permeability of hydrogen decreases with increasing temperature at least over a temperature range extending from 350° C. to 750° C. The second additive particles may be selected to comprise an element, such that the solubility of the element of the first additive particles in the element of the second additive particles and/or a solubility of the element of the second additive particles in the element of the first additive particles, over the temperature range extending from 350° C. to 750° C., is higher than any solubility of the element of the second additive particles in zirconium over the same temperature range. The third additive particles may be selected to comprise a grain-growth inhibitor that impedes the growth of grains 62 of a zirconium-based metal alloy composition over the temperature range extending from 350° C. to 750° C.

The particle mixture may further include one or more various additives such as, for example, binders, plasticizers, lubricants, emulsifiers, etc. Such additives may comprise one or more organic materials (e.g., wax and/or oil). In some embodiments, such additives may comprise one or more liquids, such that the powder mixture and the liquids together form a slurry, which may be subsequently dried and further processed. In another embodiment, the third additive may undergo thermal decomposition to yield particles comprising a dispersed grain-growth inhibitor that impedes the growth of grains 62 of a zirconium-based metal alloy composition over the temperature range extending from about 350° C. to about 750° C.

After forming the particle mixture, the particle mixture may be pressed to form a green body having a shape corresponding to the shape of the article to be formed. For example, in embodiments in which the article to be formed comprises a cladding tube 50 of a fuel rod 14, the green body may have a solid cylindrical shape (like a rod) or a generally hollow cylindrical shape like that of the cladding tube 50 to be formed. During the subsequent sintering process, the green body may undergo shrinkage of between about ten percent (10%) and about thirty percent (30%). Thus, the green body may be formed to have a size larger than the desired size of the article to be formed.

The particle mixture may be pressed to form the green body using, for example, an axial pressing process in a die or mold, or using an isostatic pressing process. Further, the particle mixture optionally may be heated prior to and/or during the pressing process to further enhance the compaction of the particles during the pressing process. Further, one or more of the individual components of the particle mixture may be heated prior to mixing, for example, to facilitate sublimation and dispersion of one or more components.

After forming the green body, the green body may be sintered to a desirable final density. For example, the green body may be heated in a furnace to cause the particles in the green body to consolidate, such that bonds are formed between the particles and porosity between the particles is at least substantially eliminated (with corresponding shrinkage in the green body as the green body is sintered). The sintering temperatures and sintering time may depend upon the particular composition being sintered, as well as on the desired microstructure to be attained in the resulting zirconium-based metal alloy composition. As non-limiting examples, however, the sintering temperature or temperatures may be between about 1,000° C. and about 1,200° C., and the sintering times may range from a few minutes (e.g., five minutes) to several hours or more (e.g., from about eight hours to about ten hours). In additional embodiments, the sintering temperature or temperatures may be between about 1,600° C. and about 1,800° C., and the sintering times may range from a few minutes (e.g., five minutes) to several hours or more (e.g., from about one hour to about five hours). In some embodiments, the green body may be subjected to an electric current while in a vacuum chamber such that the actual temperature of the green body results from its electrical resistance under the passage of electric current therethrough. Additionally, in some embodiments, pressure may be applied to the green body using, for example, a fluid pressure transmission medium (e.g., an inert gas) during at least a portion of the sintering process.

In some embodiments, at least one component of the third additive particles may be sublimated while sintering the green body in an effort to improve the distribution of the grain-growth inhibitor throughout the microstructure of the resulting sintered body. For example, certain oxide species (e.g., ThO, YO, NdO) may sublime and exist in a gaseous state so as to exhibit some vapor pressure under sintering conditions at elevated temperatures and under vacuum. These gaseous species may promote diffusion and transport through the green body during sintering to result in a uniform distribution of the grain-growth inhibitor throughout the microstructure. Upon cooling, these gaseous species may solidify and be incorporated into the grain-growth inhibitor phase within the microstructure of the resulting fully sintered body. As a result, the uniformity of the distribution of the grain-growth inhibitor phase within the microstructure of the resulting fully sintered body may be improved. Thus, the composition of the third additive particles may be selected to comprise an oxide compound, such as $Y_2O_3$, which has elements that are capable of forming one or more volatile components, such as YO, under sintering conditions.

In embodiments in which the green body comprises a solid cylindrical rod, the fully sintered rod then may be formed (e.g., by machining or by extrusion) into a hollow, cylindrical tube.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents. For example, any of the elements and features disclosed in relation to one embodiment may be combined with any of the elements and features disclosed in relation to another embodiment to provide yet further embodiments of the invention. As a non-limiting example, in additional embodiments of the disclosure, the zirconium-based metal alloy composition may only include the first additive and the third additive described herein, and may not include a second additive as described herein.

What is claimed is:

1. A zirconium-based metal alloy composition, comprising:
    zirconium;
    a first metal element additive in which the permeability of hydrogen decreases with increasing temperatures at least over a temperature range extending from 350° C. to 750° C.;
    a second metal element additive having a solubility value in zirconium over the temperature range extending from 350° C. to 750° C., wherein at least one of a solubility value of the first metal element additive in the second metal element additive over the temperature range extending from 350° C. to 750° C. and a solubility value of the second metal element additive in the first metal element additive over the temperature range extending from 350° C. to 750° C. is higher than the solubility value of the second metal element additive in zirconium over the temperature range extending from 350° C. to 750° C.;
    wherein the zirconium-based metal alloy composition has a microstructure comprising:
        a first plurality of grains comprising a first phase, the first phase comprising a zirconium-based metal alloy; and
        a second phase disposed at grain boundaries of the first plurality of grains, the second phase comprising a metal alloy based on the second metal element additive.

2. The zirconium-based metal alloy composition of claim 1, wherein the zirconium comprises at least about ninety percent by weight (90.0 wt %) of the zirconium-based metal alloy composition.

3. The zirconium-based metal alloy composition of claim 1, wherein the first metal element additive comprises between about one-tenth of one percent by weight (0.1 wt %) and about nine percent by weight (9.0 wt %) of the zirconium-based metal alloy composition.

4. The zirconium-based metal alloy composition of claim 1, wherein the second metal element additive comprises between about one-hundredth of one percent by weight (0.01 wt %) and about one percent by weight (1.0 wt %) of the zirconium-based metal alloy composition.

5. The zirconium-based metal alloy composition of claim 1, wherein the first metal element additive comprises one or more elements selected from the group consisting of niobium (Nb), tantalum (Ta), and vanadium (V).

6. The zirconium-based metal alloy composition of claim 1, wherein the second metal element additive comprises one or more elements selected from the group consisting of molybdenum (Mo), antimony (Sb), and palladium (Pd).

7. The zirconium-based metal alloy composition of claim 1, wherein:
    the first metal element additive comprises one or more elements selected from the group consisting of niobium (Nb), tantalum (Ta), and vanadium (V); and
    the second metal element additive comprises one or more elements selected from the group consisting of molybdenum (Mo), antimony (Sb), and palladium (Pd).

8. The zirconium-based metal alloy composition of claim 7, wherein:
    the first metal element additive comprises between about one-tenth of one percent by weight (0.1 wt %) and about nine percent by weight (9.0 wt %) of the zirconium-based metal alloy composition; and
    the second metal element additive comprises between about one-hundredth of one percent by weight (0.01 wt %) and about one percent by weight (1.0 wt %) of the zirconium-based metal alloy composition.

9. The zirconium-based metal alloy composition of claim 8, wherein the zirconium comprises at least about ninety percent by weight (90.0 wt %) of the zirconium-based metal alloy composition.

10. The zirconium-based metal alloy composition of claim 1, wherein the solubility value of the second metal element additive in the first metal element additive over the temperature range extending from 350° C. to 750° C. is higher than the solubility value of the second metal element additive in zirconium over the temperature range extending from 350° C. to 750° C.

11. The zirconium-based metal alloy composition of claim 1, further comprising a third additive, the third additive comprising a grain-growth inhibitor that impedes the growth of grains of the zirconium-based metal alloy composition over the temperature range extending from 350° C. to 750° C.

12. The zirconium-based metal alloy composition of claim 11, wherein the third additive comprises one or more materials selected from the group consisting of thorium oxide, yttrium oxide, lanthanum oxide, neodymium oxide, cerium oxide, and dysprosium oxide.

13. The zirconium-based metal alloy composition of claim 11, wherein the third additive comprises between about six-hundredths of one percent by volume (0.06 wt %) and about six-tenths of one percent by volume (0.60 wt %) of the zirconium-based metal alloy composition.

14. The zirconium-based metal alloy composition of claim 1, wherein the grains of the first plurality of grains have an average grain size of between about twenty-five nanometers (25 nm) and about one hundred microns (100 μm).

15. The zirconium-based metal alloy composition of claim 14, wherein the grains of the first plurality of grains comprise between about ninety percent (90%) and about ninety-nine and one-half percent (99.5%) of the volume of the zirconium-based metal alloy composition.

16. The zirconium-based metal alloy composition of claim 1, wherein the second phase comprises a second plurality of grains having an average grain size of between about ten nanometers (10 nm) and about one thousand nanometers (1,000 nm).

17. The zirconium-based metal alloy composition of claim 1, wherein the second phase comprises between about three-tenths of one percent (0.3%) and about ten percent (10%) of the volume of the zirconium-based metal alloy composition.

18. The zirconium-based metal alloy composition of claim 1, further comprising a third additive, the third additive comprising a grain-growth inhibitor that impedes the growth of grains of the zirconium-based metal alloy composition over the temperature range extending from 350° C. to 750° C., and wherein the microstructure of the zirconium-based metal alloy composition further comprises a third plurality of grains disposed at grain boundaries of the first plurality of grains, the third plurality of grains comprising the third additive.

19. A nuclear fuel rod for use in a nuclear reaction, comprising:
a volume of nuclear fuel material; and
a cladding material at least partially surrounding the volume of nuclear fuel material, the cladding material comprising a zirconium-based metal alloy composition, comprising:
zirconium;
a first metal element additive in which the permeability of hydrogen decreases with increasing temperatures at least over a temperature range extending from 350° C. to 750° C.;
a second metal element additive having a solubility value in zirconium over the temperature range extending from 350° C. to 750° C., wherein at least one of a solubility value of the first metal element additive in the second metal element additive over the temperature range extending from 350° C. to 750° C. and a solubility value of the second metal element additive in the first metal element additive over the temperature range extending from 350° C. to 750° C. is higher than the solubility value of the second metal element additive in zirconium over the temperature range extending from 350° C. to 750° C.;
wherein the zirconium-based metal alloy composition has a microstructure comprising:
a first plurality of grains comprising a zirconium-based metal alloy; and
a second plurality of grains disposed at grain boundaries of the first plurality of grains, the second plurality of grains comprising a metal alloy based on the second metal element additive.

20. The nuclear fuel rod of claim 19, wherein:
the first metal element additive comprises one or more elements selected from the group consisting of niobium (Nb), tantalum (Ta), and vanadium (V); and
the second metal element additive comprises one or more elements selected from the group consisting of molybdenum (Mo), antimony (Sb), and palladium (Pd).

21. The nuclear fuel rod of claim 19, wherein:
the first metal element additive comprises between about one-tenth of one percent by weight (0.1 wt %) and about nine percent by weight (9.0 wt %) of the zirconium-based metal alloy composition; and
the second metal element additive comprises between about one-hundredth of one percent by weight (0.01 wt %) and about one percent by weight (1.0 wt %) of the zirconium-based metal alloy composition.

22. The nuclear fuel rod of claim 19, wherein the zirconium comprises at least about ninety percent by weight (90.0 wt %) of the zirconium-based metal alloy composition.

23. The nuclear fuel rod of claim 19, further comprising a third additive, the third additive comprising a grain-growth inhibitor that impedes the growth of grains of the zirconium-based metal alloy composition over the temperature range extending from 350° C. to 750° C.

24. The nuclear fuel rod of claim 23, wherein the third additive comprises between about six-hundredths of one percent by volume (0.06 wt %) and about six-tenths one percent by volume (0.6 wt %) of the zirconium-based metal alloy composition.

25. The nuclear fuel rod of claim 19, wherein the grains of the first plurality of grains have an average grain size of between about twenty-five nanometers (25 nm) and about one hundred microns (100 μm).

26. The nuclear fuel rod of claim 25, wherein the grains of the first plurality of grains comprise between about ninety percent (90%) and about ninety-nine and one-half percent (99.5%) of the volume of the zirconium-based metal alloy composition.

27. The nuclear fuel rod of claim 19, wherein the grains of the second plurality of grains have an average grain size of between about ten nanometers (10 nm) and about one thousand nanometers (1,000 nm).

28. The nuclear fuel rod of claim 19, wherein the grains of the second plurality of grains comprise between about three-tenths of one percent (0.3%) and about ten percent (10%) of the volume of the zirconium-based metal alloy composition.

29. The nuclear fuel rod of claim 19, wherein the zirconium-based metal alloy composition further comprises a third additive, the third additive comprising a grain-growth inhibitor that impedes the growth of grains of the zirconium-based metal alloy composition over the temperature range extending from 350° C. to 750° C., and wherein the microstructure of the zirconium-based metal alloy composition further comprises a third plurality of grains disposed at grain boundaries of the first plurality of grains, the third plurality of grains comprising the third additive.

30. A nuclear reactor, comprising:
a reactor core for generating thermal energy, comprising:
a liquid; and
at least one fuel rod disposed within the liquid, the at least one fuel rod including at least one nuclear fuel material at least partially surrounded by a cladding material, the cladding material comprising a zirconium-based metal alloy composition, comprising:
zirconium;
a first metal element additive in which the permeability of hydrogen decreases with increasing temperatures at least over a temperature range extending from 350° C. to 750° C.;
a second metal element additive having a solubility value in zirconium over the temperature range extending from 350° C. to 750° C., wherein at least one of a solubility value of the first metal element additive in the second metal element additive over the temperature range extending from 350° C. to 750° C. and a solubility value of the second metal element additive in the first metal element additive over the temperature range extending from 350° C. to 750° C. is higher than the solubility value of the second metal element additive in zirconium over the temperature range extending from 350° C. to 750° C.;

wherein the zirconium-based metal alloy composition has a microstructure comprising:
a first plurality of grains comprising a zirconium-based metal alloy; and
a second plurality of grains disposed at grain boundaries of the first plurality of grains, the second plurality of grains comprising a metal alloy based on the second metal element additive.

31. A method of forming a zirconium-based metal alloy composition, comprising:
mixing zirconium particles, first metal element additive particles, second metal element additive particles, and third additive particles to form a particle mixture;
wherein the first metal element additive particles comprise one or more elements in which the permeability of hydrogen decreases with increasing temperatures at least over a temperature range extending from 350° C. to 750° C.;
wherein the second metal element additive particles comprise an element having a solubility value in zirconium over the temperature range extending from 350° C. to 750° C., and wherein at least one of a solubility value of the element of the first metal element additive particles in the element of the second metal element additive particles over the temperature range extending from 350° C. to 750° C. and a solubility value of the element of the second metal element additive particles in the element of the first metal element additive particles over the temperature range extending from 350° C. to 750° C. is higher than the solubility value of the element of the second metal element additive particles in zirconium over the temperature range extending from 350° C. to 750° C.;
wherein the third additive particles comprise a grain-growth inhibitor that impedes the growth of grains of a zirconium-based metal alloy composition over the temperature range extending from 350° C. to 750° C.;
pressing the particle mixture to form a green body; and
sintering the green body.

32. The method of claim 31, wherein sintering the green body comprises sublimating at least one component of the third additive particles.

33. The method of claim 31, wherein:
the first metal element additive particles comprise to comprise one or more elements from the group consisting of niobium (Nb), tantalum (Ta), and vanadium (V); and
the second metal element additive particles comprise one or more elements from the group consisting of molybdenum (Mo), antimony (Sb), and palladium (Pd).

34. The method of claim 33, wherein:
the first metal element additive particles comprise between about one-tenth of one percent by weight (0.1 wt %) and about nine percent by weight (9.0 wt %) of the zirconium-based metal alloy composition; and
the second metal element additive particles comprise between about one-hundredth of one percent by weight (0.01 wt %) and about one percent by weight (1.0 wt %) of the zirconium-based metal alloy composition.

35. The method of claim 34, wherein the zirconium particles comprise at least about ninety percent by weight (90.0 wt %) of the zirconium-based metal alloy composition.

36. The method of claim 31, wherein the third additive particles comprise between about six-hundredths of one percent by volume (0.06 wt %) and about six-tenths of one percent by volume (0.6 wt %) of the zirconium-based metal alloy composition.

37. The method of claim 31, further comprising forming a microstructure comprising:
a first plurality of grains comprising a zirconium-based metal alloy; and
a second plurality of grains disposed at grain boundaries of the first plurality of grains, the second plurality of grains comprising a metal alloy based on the second metal element additive particles.

38. The method of claim 37, further comprising forming the grains of the first plurality of grains to have an average grain size of between about twenty-five nanometers (25 nm) and about one hundred microns (100 μm).

39. The method of claim 38, further comprising forming the grains of the first plurality of grains to comprise between about ninety percent (90%) and about ninety-nine and one-half percent (99.5%) of the volume of the zirconium-based metal alloy composition.

40. The method of claim 37, further comprising forming the grains of the second plurality of grains to have an average grain size of between about ten nanometers (10 nm) and about one thousand nanometers (1,000 nm).

41. The method of claim 40, further comprising forming the grains of the second plurality of grains to comprise between about three-tenths of one percent (0.3%) and about ten percent (10%) of the volume of the zirconium-based metal alloy composition.

42. The method of claim 37, further comprising forming the microstructure of the zirconium-based metal alloy composition to comprise a third plurality of grains disposed at grain boundaries of the first plurality of grains, the third plurality of grains comprising a material formed from the third additive particles.

\* \* \* \* \*